United States Patent
Amano et al.

(10) Patent No.: US 11,111,319 B2
(45) Date of Patent: Sep. 7, 2021

(54) POLYVINYL ALCOHOL

(71) Applicant: KURARAY CO., LTD., Kurashiki (JP)

(72) Inventors: Yusuke Amano, Kurashiki (JP);
Takumi Takayama, Kurashiki (JP);
Kazuhiko Maekawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/089,441

(22) PCT Filed: Mar. 30, 2017

(86) PCT No.: PCT/JP2017/013412
§ 371 (c)(1),
(2) Date: Sep. 28, 2018

(87) PCT Pub. No.: WO2017/170938
PCT Pub. Date: Oct. 5, 2017

(65) Prior Publication Data
US 2019/0100607 A1    Apr. 4, 2019

(30) Foreign Application Priority Data

Mar. 31, 2016 (JP) .............................. JP2016-071872

(51) Int. Cl.
*C08F 16/06* (2006.01)
*C08F 116/06* (2006.01)

(52) U.S. Cl.
CPC ............ *C08F 16/06* (2013.01); *C08F 116/06* (2013.01)

(58) Field of Classification Search
CPC ............................... C08F 16/06; C08F 116/06
See application file for complete search history.

(56) References Cited

U.S. PATENT DOCUMENTS

2003/0178608 A1    9/2003  Isozaki et al.
2006/0008431 A1*   1/2006  Farcet ................. A61K 8/8152
                                                    424/60
2006/0089423 A1*   4/2006  Ueno .................... C09D 17/001
                                                    523/160
2012/0041118 A1    2/2012  Shibutani et al.
2016/0319048 A1    11/2016 Kato et al.
2019/0119414 A1*   4/2019  Takayama ................ C08F 2/38

FOREIGN PATENT DOCUMENTS

| EP | 2 426 172 A1 | 3/2012 |
| EP | 3 088 430 A1 | 11/2016 |
| JP | 2-33314 A | 2/1990 |
| JP | 11-147914 A | 6/1999 |
| JP | 2002-174726 A | 6/2002 |
| JP | 2003-342322 A | 12/2003 |
| JP | 2012-77185 A | 4/2012 |
| JP | 2013-242341 A | 12/2013 |
| JP | 2015-890 A | 1/2015 |
| RU | 2265617 | * 12/2005 |
| WO | WO 2015/098996 A1 | 7/2015 |

OTHER PUBLICATIONS

Bojko et al., electronic translation of RU 2265617, Dec. 2005.*
Extended European Search Report dated Sep. 17, 2019 in European Patent Application No. 17775472.8, 7 pages.
International Search Report dated May 16, 2017, in PCT/JP2017/013412, filed Mar. 30, 2017.
Iovu, M. et al., "Controlled/Living Radical Polymerization of Vinyl Acetate by Degenerative Transfer with Alkyl Iodides", Macromolecules, vol. 36, 2003, pp. 9346-9354.
Debuigne, A. et al.; "Highly Efficient Cobalt-Mediated Radical Polymerization of Vinyl Acetate", Angewandte Chemie International Edition, vol. 44, 2005, pp. 1101-1104.
Debuigne, A. et al., "Synthesis of End-Functional Poly(vinyl acetate) by Cobalt-Mediated Radical Polymerization", vol. 38, 2005, pp. 5452-5458.

* cited by examiner

*Primary Examiner* — Jeffrey C Mullis
(74) *Attorney, Agent, or Firm* — Oblon, McClelland, Maier & Neustadt, L.L.P.

(57) ABSTRACT

A polyvinyl alcohol has a number-average molecular weight (Mn) from 4,400 to 440,000, a molecular weight distribution (Mw/Mn) from 1.05 to 1.70, a degree of saponification from 80 to 99.99 mol %, and a carbon-carbon double bond content (X) of 0.1 mol % or less based on total monomer units, and satisfying a formula (1) below. A polyvinyl alcohol, having a narrow molecular weight distribution and a high number-average molecular weight with good hue, and a method for producing the same are thus provided.

$$X \cdot Mn \leq 1000 \quad (1)$$

6 Claims, 2 Drawing Sheets

POLYVINYL ALCOHOL

TECHNICAL FIELD

The present invention relates to a polyvinyl alcohol having a narrow molecular weight distribution and a high number-average molecular weight with good hue.

BACKGROUND ART

Polyvinyl alcohol (hereinafter, may be abbreviated as PVA) resins are crystalline water-soluble polymer materials and are widely applied to emulsifiers, suspensions, surfactants, fiber treating agents, various binders, paper treating agents, adhesives, films, and the like using their excellent water solubility and film properties (strength, grease resistance, film formability, oxygen gas barrier properties, etc.). Conventionally, PVAs having different degrees of saponification and polymerization are employed depending on the use. Various modified PVAs with special functions by introducing a functional group into PVAs are proposed.

Polyvinyl alcohols are industrially produced by saponification of polyvinyl acetate that is obtained by radically polymerizing vinyl acetate. In radical polymerization reaction of vinyl acetate, various types of side reaction, such as chain transfer reaction and recombination termination reaction, occur during the polymerization, and thus it is generally considered difficult to precisely control the molecular weight distribution, the end structure, and the like of the polyvinyl acetate (and polyvinyl alcohols) thus obtained. For improvement in thermal stability and mechanical properties of polyvinyl alcohols, polymers having a less content of a low molecular weight polymer, that is, polymers having a high molecular weight and a narrow molecular weight distribution are considered preferred.

In recent years, with the advances in the so-called living radical polymerization technique, some methods for controlling radical polymerization reaction of vinyl acetate have been proposed. For example, a method is proposed that comprises radical polymerization reaction of vinyl acetate in the presence of a radical polymerization initiator and a specific control agent to obtain polyvinyl acetate having a narrow molecular weight distribution. In such polymerization reaction, a propagating radical end of the molecular chain of polyvinyl acetate is covalently bonded with the control agent to form dormant species. The polymerization progresses while establishing an equilibrium between the dormant species and radical species generated by dissociation of the dormant species. Such polymerization reaction is referred to as controlled radical polymerization.

However, it used to be difficult to obtain polyvinyl acetate with a high molecular weight by controlled radical polymerization in the past. This is considered to be because a radical is thermally extremely unstable that is generated at an end of a head-to-head bond (a bond having acetyl groups of vinyl acetate adjacent to each other) generated with a certain probability during the polymerization and the equilibrium is thus largely shifted to the dormant species side, resulting in no further progress of the polymerization reaction. In contrast, in a case where the polymerization temperature is raised to promote thermal dissociation of the dormant species, the controllability becomes worse in spite of the progress of the reaction. Accordingly, it has been extremely difficult to obtain polyvinyl acetate with a high molecular weight while maintaining controllability.

Regarding such a problem, Patent Document 1 reports an example in which radical polymerization reaction of vinyl acetate is performed in the presence of a control agent containing a radical polymerization initiator and an iodine compound, thereby synthesizing polyvinyl acetate having a number-average molecular weight (Mn) of 92,000 and a molecular weight distribution (Mw/Mn) of 1.57 and saponifying it to produce a polyvinyl alcohol. However, in the polymerization method using an iodine compound as a control agent, it is known that an aldehyde group is formed at a polymerization end of polyvinyl acetate (e.g., refer to Non-Patent Document 1). In a case of saponifying such polyvinyl acetate having an aldehyde group at an end, it is known that a conjugated polyene structure where plural carbon-carbon double bonds are conjugated is formed to obtain markedly colored polyvinyl alcohols.

Recently, a technique has been proposed to synthesize polyvinyl acetate having a narrow molecular weight distribution and a high molecular weight by controlled radical polymerization using an organic cobalt complex as a control agent. In the polymerization reaction, the propagating radical end of the molecular chain of polyvinyl acetate is covalently bonded with a cobalt atom of an organic cobalt complex to form dormant species. The polymerization progresses while establishing equilibrium between the dormant species and radical species generated by dissociation of the dormant species. For example, Non-Patent Document 2 reports an example in which vinyl acetate is polymerized in the presence of cobalt (II) acetylacetonate, thereby synthesizing polyvinyl acetate having a number-average molecular weight (Mn) of 99,000 and a molecular weight distribution (Mw/Mn) of 1.33.

Non-Patent Document 3 describes that a polyvinyl acetate chain obtained by polymerizing vinyl acetate in the presence of cobalt (II) acetylacetonate is treated with 1-propanethiol. While the polyvinyl acetate chain forms a dormant species bonded with a cobalt (III) complex at an end, an end radical formed by cleavage of the dormant species reacts with 1-propanethiol, thereby allowing separation of the cobalt complex from the polyvinyl acetate chain. While polyvinyl acetate forming the dormant species is green, it is described that the separated cobalt complex is precipitated, followed by filtration through celite for removal to obtain less colored polyvinyl acetate. Instead of 1-propanethiol, TEMPO (2,2, 6,6-tetramethylpiperidine 1-oxyl) as a stable radical compound may be used for bonding of TEMPO with the end radical to trap a radical. It is described that, in this case as well, the cobalt complex is filtered with acidic alumina for removal to obtain colorless polyvinyl acetate.

As just described, according to the method described in Non-Patent Document 3, it is possible to obtain less colored polyvinyl acetate. However, Non-Patent Document 3 does not describe that the polyvinyl acetate thus obtained is subjected to saponification to yield polyvinyl alcohol. As a result of experiments by the present inventors, it was found that the polyvinyl alcohol obtained by saponifying the polyvinyl acetate obtained in accordance with Non-Patent Document 3 was colored.

PRIOR ART DOCUMENT

Patent Document

Patent Document 1: JP 11-147914 A

Non-Patent Document

Non-Patent Document 1: Controlled/Living Radical Polymerization of Vinyl Acetate by Degenerative Transfer with Alkyl Iodides, Macromolecules, 2003, vol. 36, p 9346-9354

Non-Patent Document 2: Highly Efficient Cobalt-Mediated Radical Polymerization of Vinyl Acetate, Angewandte Chemie International Edition, 2005, vol. 44, p 1101-1104

Non-Patent Document 3: Synthesis of End-Functional Poly (vinyl acetate) by Cobalt-Mediated Radical Polymerization, Macromolecules, 2005, vol. 38, p 5452-5458

SUMMARY OF THE INVENTION

Problems to be Solved by the Invention

The present invention has been made to solve the above problems, and it is an object thereof to provide a polyvinyl alcohol having a narrow molecular weight distribution and a high number-average molecular weight with good hue.

Means for Solving the Problems

The above problems are solved by providing a polyvinyl alcohol having a number-average molecular weight (Mn) from 4,400 to 440,000, a molecular weight distribution (Mw/Mn) from 1.05 to 1.70, a degree of saponification from 80 to 99.99 mol %, and a carbon-carbon double bond content (X) of 0.1 mol % or less based on total monomer units, and satisfying a formula (1) below.

$$X \cdot Mn \leq 1000 \tag{1}$$

In this context, it is preferred that a yellow index (YI) measured in accordance with ASTM D1925 is 50 or less.

The above problems are also solved by providing a polyvinyl alcohol having a number-average molecular weight (Mn) from 4,400 to 440,000, a molecular weight distribution (Mw/Mn) from 1.05 to 1.70, a degree of saponification from 80 to 99.99 mol %, and a yellow index (YI) measured in accordance with ASTM D1925 of 50 or less.

In any one of the above polyvinyl alcohols, it is preferred that a 1,2-glycol bond content is from 0.7 to 1.5 mol %.

The above problems are further solved by providing a method for producing the polyvinyl alcohol, comprising: a polymerization step comprising polymerizing vinyl ester monomers by controlled radical polymerization in the presence of a radical initiator and an organic cobalt complex; a termination step comprising terminating the polymerization by adding a proton-donating polymerization terminator after the polymerization step to obtain polyvinyl ester; and a saponification step comprising saponifying the polyvinyl ester obtained in the termination step to obtain a polyvinyl alcohol.

Effects of the Invention

The polyvinyl alcohol of the present invention has a narrow molecular weight distribution and a high number-average molecular weight with good hue. Since the polyvinyl alcohol has high crystallinity derived from the narrow molecular weight distribution, shaped articles of the polyvinyl alcohol are excellent in gas barrier properties. The polyvinyl alcohol having the high number-average molecular weight in addition to the narrow molecular weight distribution allows production of shaped articles with high elasticity and high strength. Since the polyvinyl alcohol of the present invention has good solubility in water, it is applicable to various types of use requiring water solubility. Since the polyvinyl alcohol has a low yellow index (YI), it is also applicable to various types of use with importance on appearance.

MODES FOR CARRYING OUT THE INVENTION

Figure 1:
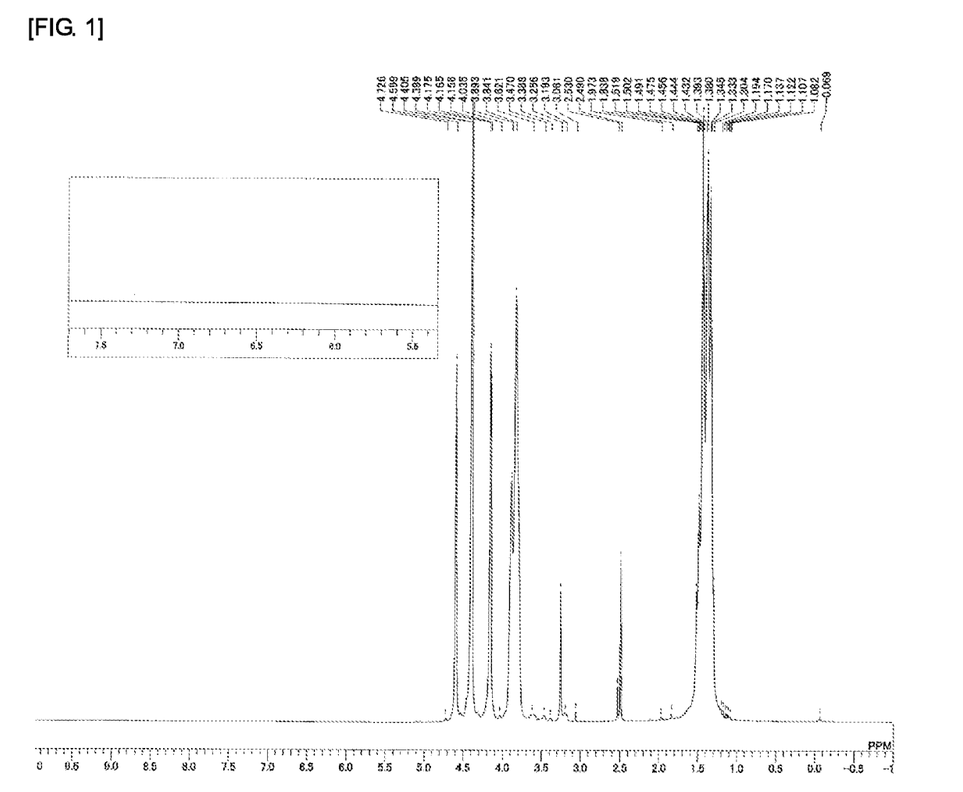
FIG. 1 is a $^1$H-NMR chart of a polyvinyl alcohol obtained in Example 1.
Figure 2:
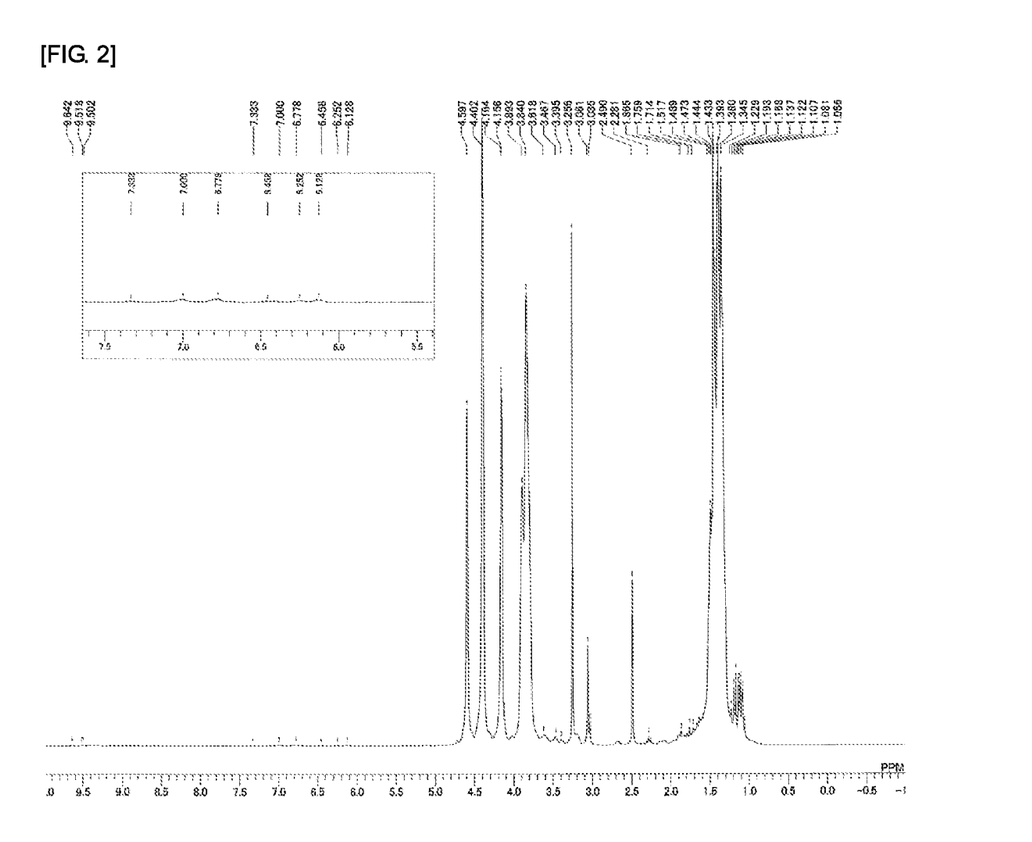
FIG. 2 is a $^1$H-NMR chart of a polyvinyl alcohol obtained in Comparative Example 4.

A polyvinyl alcohol of the present invention has a number-average molecular weight (Mn) from 4,400 to 440,000, a molecular weight distribution (Mw/Mn) from 1.05 to 1.70, a degree of saponification from 80 to 99.99 mol %, and a carbon-carbon double bond content (X) of 0.1 mol % or less based on total monomer units, and satisfying a formula (1) below.

$$X \cdot Mn \leq 1000 \tag{1}$$

No polyvinyl alcohol has been previously known that has a narrow molecular weight distribution and a high number-average molecular weight with good hue. The present inventors successfully produced such a polyvinyl alcohol for the first time. A polyvinyl alcohol with good hue is provided by having a certain amount or less of carbon-carbon double bond content (X) and having the content (X) and the number-average molecular weight (Mn) satisfying predetermined relationship.

Another polyvinyl alcohol of the present invention has a number-average molecular weight (Mn) from 4,400 to 440,000, a molecular weight distribution (Mw/Mn) from 1.05 to 1.70, a degree of saponification from 80 to 99.99 mol %, and a yellow index (YI) measured in accordance with ASTM D1925 of 50 or less. In this polyvinyl alcohol, the yellow index (YI) is limited to a certain value or less instead of limiting the carbon-carbon double bond content (X) in the polyvinyl alcohol previously mentioned. A polyvinyl alcohol with good hue is also provided in this manner.

A preferred method for producing the polyvinyl alcohol of the present invention includes: a polymerization step comprising polymerizing vinyl ester monomers by controlled radical polymerization in the presence of a radical initiator and an organic cobalt complex; a termination step comprising terminating the polymerization by adding a proton-donating polymerization terminator after the polymerization step to obtain polyvinyl ester; and a saponification step comprising saponifying the polyvinyl ester obtained in the termination step to obtain a polyvinyl alcohol. The production method is described below in detail.

Firstly, the polymerization step is described. In the polymerization step, vinyl ester monomers are polymerized by controlled radical polymerization in the presence of a radical initiator and an organic cobalt complex. The controlled radical polymerization is polymerization reaction where reaction progresses in an equilibrium state between a propagating radical end (active species) and covalent species (dormant species) formed by the propagating radical end bonded with a control agent. In the present invention, an organic cobalt complex is used as the control agent.

Examples of the vinyl ester monomers used in the present invention may include vinyl formate, vinyl acetate, vinyl trifluoroacetate, vinyl propionate, vinyl valerate, vinyl butyrate, vinyl isobutyrate, vinyl pivalate, vinyl caprate, vinyl laurate, vinyl stearate, vinyl benzoate, vinyl versatate, and the like. From an economic perspective, vinyl acetate is preferably used.

The polyvinyl ester produced in the present invention may be a product of copolymerization with copolymerizable ethylenic unsaturated monomers without impairing the effects of the present invention. Examples of the ethylenic unsaturated monomers may include: olefins, such as ethylene, propylene, 1-butene, and isobutene; unsaturated carboxylic acids, such as acrylic acid, methacrylic acid, crotonic acid, phthalic acid (anhydride), maleic acid (anhydride), and itaconic acid (anhydride), salts thereof, mono- or di-alkyl (carbon number from 1 to 18) esters thereof, or anhydrides thereof; acrylamides, such as acrylamide, N-alkyl (carbon number from 1 to 18) acrylamide, N,N-dimethylacrylamide, 2-acrylamide propanesulfonate or salt thereof, and acrylamide propyldimethylamine or acid salts thereof or quaternary salt thereof; methacrylamides, such as methacrylamide, N-alkyl (carbon number from 1 to 18) methacrylamide, N,N-dimethylmethacrylamide, 2-methacrylamide propanesulfonate or salt thereof, and methacrylamide propyldimethylamine or acid salts thereof or quaternary salt thereof; N-vinylamides, such as N-vinyl pyrrolidone, N-vinyl formamide, and N-vinyl acetamide; vinyl cyanides, such as acrylonitrile and methacrylonitrile; vinyl ethers, such as alkyl (carbon number from 1 to 18) vinyl ether, hydroxyalkyl vinyl ether, and alkoxyalkyl vinyl ether; vinyl halides, such as vinyl chloride, vinylidene chloride, vinyl fluoride, vinylidene fluoride, and vinyl bromide; vinyl silanes, such as trimethoxyvinyl silane; allyl acetate; allyl chloride; allyl alcohol; dimethylallyl alcohol; trimethyl-(3-acrylamide dimethylpropyl)-ammonium chloride; acrylamide-2-methylpropanesulfonic acid; and the like.

Examples of the method for polymerizing the vinyl ester monomers may include known methods, such as bulk polymerization, solution polymerization, suspension polymerization, and emulsion polymerization. Among all, bulk polymerization in which polymerization is conducted in a nonsolvent system or solution polymerization in which polymerization is conducted in various organic solvents is usually employed. To obtain a polymer having a narrow molecular weight distribution, bulk polymerization is preferred that does not use a solvent and a dispersion medium with a possibility of side reactions, such as chain transfer. Meanwhile, solution polymerization is sometimes preferred from the perspective of viscosity control of the reaction liquid, control of the polymerization rate, and the like. Examples of the organic solvent used as the solvent in solution polymerization may include: esters, such as methyl acetate and ethyl acetate; aromatic hydrocarbons, such as benzene and toluene; lower alcohols, such as methanol and ethanol; and the like. Among them, to prevent chain transfer, esters and aromatic hydrocarbons are preferably used. The amount of the solvent may be determined considering the viscosity of the reaction solution in accordance with a target number-average molecular weight of the polyvinyl alcohol. For example, the amount is selected from a mass ratio (solvent/monomer) ranging from 0.01 to 10. The mass ratio (solvent/monomer) is preferably 0.1 or more and is preferably 5 or less.

As the radical initiator used in the polymerization step, conventionally known azo initiators, peroxide initiators, redox initiators, and the like are appropriately selected. Examples of such an azo initiator may include 2,2'-azobisisobutyronitrile, 2,2'-azobis(2,4-dimethylvaleronitrile), 2,2'-azobis(4-methoxy-2,4-dimethylvaleronitrile) ("V-70"), and the like. Examples of such a peroxide initiator include: percarbonate compounds, such as diisopropyl peroxydicarbonate, di-2-ethylhexyl peroxydicarbonate, and diethoxyethyl peroxydicarbonate; perester compounds, such as t-butyl peroxyneodecanate, α-cumyl peroxyneodecanate, and t-butyl peroxydecanate; acetylcyclohexylsulfonyl peroxide; diisobutyryl peroxide; 2,4,4-trimethylpentyl-2-peroxyphenoxy acetate; and the like. Furthermore, the above initiator can be combined with potassium persulfate, ammonium persulfate, hydrogen peroxide, or the like, to be an initiator. Examples of such a redox initiator may include combinations of the above peroxide with a reducing agent, such as sodium hydrogen sulfite, sodium hydrogen carbonate, tartaric acid, L-ascorbic acid, and Rongalite. The amount of the initiator differs according to the polymerization catalyst and thus cannot be unconditionally determined and is arbitrarily selected depending on the polymerization rate.

The organic cobalt complex used as the control agent in the polymerization step may contain a divalent cobalt atom and an organic ligand. Examples of a preferred organic cobalt complex may include cobalt (II) acetylacetonate [$Co(acac)_2$], a cobalt (II) porphyrin complex, and the like. Among all, cobalt (II) acetylacetonate is preferred from the perspective of production costs.

In the controlled radical polymerization used in the present invention, firstly, the radical initiator is decomposed to produce a radical and the radical is bonded with a small number of vinyl ester monomers to produce a short-chain polymer having a radical at a propagating end, and the radical is bonded with an organic cobalt (II) complex, thereby producing a dormant species where covalently bonded with an organic cobalt (III) complex at a polymer end. In a certain period after initiation of the reaction, such short-chain polymer is produced only to be converted to dormant species and thus the degree of polymerization does not substantially increase. Such a period is referred to as an induction period. After consumption of the organic cobalt (II) complex, a growth period begins in which the degree of polymerization increases and most molecular chains in the reaction system have a molecular weight similarly increasing in proportion to polymerization time. This allows production of polyvinyl ester having a narrow molecular weight distribution.

As described above, in the controlled radical polymerization of the present invention, one polyvinyl ester chain is theoretically yielded from one molecule of the organic cobalt complex to be added. Accordingly, the amount of the organic cobalt complex to be added to the reaction liquid is determined considering target number-average molecular weight and rate of polymerization. Usually, based on 100 mol of the vinyl ester monomers, from 0.001 to 1 mol of the organic cobalt complex is preferably used.

A molar number of the generated radical not more than the molar number of the organic cobalt complex causes the polymerization reaction to progress only by a mechanism in which a Co complex is thermally dissociated from the dormant species, resulting in an extremely low polymerization rate depending on the reaction temperature. Accordingly, considering that the radical initiator produces two radicals, the molar number of the radical initiator to be used has to be more than ½ times the molar number of the organic cobalt complex. The amount of active radicals supplied from the initiator generally depends on initiator efficiency and thus there are actually deactivated initiators not used for the formation of dormant species. Accordingly, the molar number of the radical initiator to be used is preferably not less than one time, more preferably not less than 1.5 times, the molar number of the organic cobalt complex. Meanwhile, a molar number of the generated radical excessively more than the molar number of the organic cobalt complex causes an increase in the ratio of uncontrolled radical polymerization and thus broadening of the molecular weight distribution. The molar number of the radical initiator to be used is preferably not more than 10 times, more preferably not more than 6 times, the molar number of the organic cobalt complex.

The polymerization temperature is preferably, for example, from 0° C. to 80° C. A polymerization temperature of less than 0° C. causes an insufficient polymerization rate and thus productivity turns out to be reduced. In this regard, the polymerization temperature is more preferably 10° C. or more and even more preferably 20° C. or more. Meanwhile, a polymerization temperature of more than 80° C. causes broadening of the molecular weight distribution of polyvinyl ester to be obtained. In this regard, the polymerization temperature is more preferably 65° C. or less and even more preferably 50° C. or less.

In the polymerization step, at the target rate of polymerization, the polymerization reaction is terminated by adding a proton-donating polymerization terminator. The polyvinyl acetate thus obtained is saponified to produce a polyvinyl alcohol with good hue. Although not being fully clear, the reason is considered to be because the proton-donating polymerization terminator supplies a proton radical to a radical produce by cleavage of dormant species, thereby allowing hydrogenation while suppressing side reaction. After that, generation of a conjugated double bond is suppressed during saponification of the polyvinyl acetate to allow production of a polyvinyl alcohol with a low yellow index (YI) and good hue. The time taken for the polymerization step in total of the induction period and the growth period is usually from 3 to 50 hours. In this situation, use of a thiol compound, such as 1-propanethiol used in Non-Patent Document 3, causes production of a thio radical when the thiol compound reacts with a radical at a polymer end. Since a thio radical has reinitiation capability of polymerization reaction, it again reacts with a vinyl ester monomer and a cobalt complex. Accordingly, a thiol compound does not function as a polymerization terminator and a polyvinyl alcohol produced using such a thiol compound is colored.

The molar number of the proton-donating polymerization terminator to be added is preferably from 1 to 100 times the molar number of the added organic cobalt complex. An excessively small molar number of the proton-donating polymerization terminator causes a risk of not sufficiently trapping radicals at polymer ends to deteriorate color tone of the polyvinyl alcohol to be obtained. The molar number of the proton-donating polymerization terminator is thus more preferably 5 times or more the molar number of the organic cobalt complex. Meanwhile, an excessively large molar number of the proton-donating polymerization terminator causes a risk of raising production costs. The molar number of the proton-donating polymerization terminator is more preferably 50 times or less the molar number of the organic cobalt complex.

The proton-donating polymerization terminator used in the termination step is a polymerization terminator capable of providing a proton radical to a radical at an end of a polyvinyl acetate chain and has a chain transfer constant to vinyl acetate at 60° C. of preferably 0.1 or more. Examples may include sorbic acid used in Examples described later and the like. As another example, an organic metal compound having a metal-hydrogen bond and the like may be used.

A temperature of the reaction liquid in the termination step may be a temperature allowing the proton-donating polymerization terminator to provide a proton radical to a radical at an end of a polyvinyl acetate chain and is preferably from 0° C. to 80° C. A temperature of the reaction liquid at less than 0° C. causes too much time taken for the termination step and reduction in productivity. In this regard, the temperature is more preferably 10° C. or more and even more preferably 20° C. or more. Meanwhile, a temperature of the reaction liquid at more than 80° C. causes a risk of unnecessary progression of vinyl acetate polymerization and an increase in the molecular weight distribution (Mw/Mn). In this regard, the temperature is more preferably 70° C. or less and even more preferably 60° C. or less. The time taken for the termination step is from 10 minutes to 5 hours.

After the termination step, an extraction step is preferably performed by contacting an aqueous solution containing a water-soluble ligand with the polyvinyl ester solution thus obtained to extract and remove the cobalt complex from the polyvinyl ester solution. As just described, the saponification step performed after removal in advance of a cobalt complex contained in the polyvinyl ester solution allows production of a polyvinyl alcohol with good hue and less likely to be gelated. Specifically, an operation may be performed in which the aqueous solution and the polyvinyl ester solution, which are mutually insoluble, is vigorously stirred to have their interface with a greater area and then left them standing to separate the mixture into an oil layer and a water layer, followed by removal of the water layer. This operation may be repeated a plurality of times.

The water-soluble ligand used in the extraction step is preferably acid having a pKa at 25° C. from 0 to 12. Since use of strong acid having a pKa of less than 0 makes it difficult to efficiently extract a cobalt complex, the pKa is preferably 2 or more. Since use of weak acid having a pKa of more than 12 also makes it difficult to efficiently extract a cobalt complex, the pKa is preferably 7 or less. If the acid is polyacid, a first dissociation constant (pKa1) has to be in the above range. The acid having a pKa from 0 to 12 is preferably carboxylic acid or phosphoric acid (pKa1 of 2.1) and more preferably carboxylic acid. Among all, acetic acid (pKa of 4.76) is particularly preferred.

The aqueous solution containing the water-soluble ligand preferably has a pH from 0 to 5. The pH is more preferably 1 or more and even more preferably 1.5 or more. The pH is more preferably 4 or less and even more preferably 3 or less.

In the saponification step, the polyvinyl ester obtained in the termination step is saponified to obtain a polyvinyl alcohol. In this situation, the saponification step may be performed after the extraction step is performed after the termination step.

In the saponification step, the polyvinyl ester produced in the previously mentioned method is saponified in the state of being solved in alcohol or hydrous alcohol to obtain a polyvinyl alcohol. Examples of the alcohol used for the saponification reaction may include lower alcohols, such as methanol and ethanol, and methanol is particularly preferably used. The alcohol used for the saponification reaction may contain a solvent, such as acetone, esters like methyl acetate and ethyl acetate, and toluene. Examples of the catalyst used for the saponification reaction may include: hydroxides of alkali metals, such as potassium hydroxide and sodium hydroxide; alkaline catalysts, such as sodium methylate; and acidic catalysts, such as mineral acid. An appropriate temperature of the saponification reaction ranges, for example, from 20° C. to 60° C. When a gelatinous product is precipitated with progress of the saponification reaction, the product is ground at that timing and washed, followed by being dried to obtain a polyvinyl alcohol.

The polyvinyl alcohol of the present invention has a degree of saponification from 80 to 99.99 mol %. A degree of saponification of less than 80 mol % causes a severe decrease in crystallinity of the polyvinyl alcohol and a decrease in physical properties, such as mechanical strength and barrier properties, of a shaped article to be obtained. The degree of saponification is preferably 85 mol % or more and more preferably 90 mol % or more. Meanwhile, a degree of saponification of more than 99.99 mol % causes a risk of difficulty in production of a polyvinyl alcohol and a worsening of formability. The degree of saponification is preferably 99.95 mol % or less.

The polyvinyl alcohol of the present invention has a number-average molecular weight (Mn) from 4,400 to 440,000. Use of the organic cobalt complex as a control agent allows production of a polyvinyl alcohol having a narrow molecular weight distribution and a high number-average molecular weight (Mn). From the perspective of obtaining shaped articles of high strength, the number-average molecular weight (Mn) is preferably 11,000 or more and more preferably 22,000 or more. Meanwhile, an excessively high number-average molecular weight (Mn) sometimes causes too high viscosity of the solution and thus difficulty in handling or sometimes causes a decrease in the rate of dissolution. The number-average molecular weight (Mn) is thus preferably 220,000 or less and more preferably 190,000 or less. A number-average molecular weight (Mn) and a weight-average molecular weight (Mw) in the present invention are values measured in an HFIP column using polymethylmethacrylate as a reference material by gel permeation chromatography (GPC). The measurement method is described in Examples.

The polyvinyl alcohol of the present invention has a molecular weight distribution (Mw/Mn) from 1.05 to 1.70. Polymerization by controlled radical polymerization allows production of a polyvinyl alcohol having a narrow molecular weight distribution. The molecular weight distribution is preferably 1.60 or less and more preferably 1.55 or less. A molecular weight distribution in the above range increases crystallinity of the produced polyvinyl alcohol, leading to excellent gas barrier properties of shaped articles using the polyvinyl alcohol. A molecular weight distribution in the above range and a number-average molecular weight in the above range allow production of shaped articles with high elasticity and high strength.

The polyvinyl alcohol of the present invention preferably has a carbon-carbon double bond content (X) of 0.1 mol % or less based on total monomer units. As a result of investigations by the present inventors, it was found that, depending on the type of compound to terminate the polymerization reaction of vinyl ester, a carbon-carbon double bond was formed at an end during saponification of the produced polyvinyl ester. It was also made clear that some of such carbon-carbon double bonds formed a mutually conjugated polyene structure and absorbed visible light, resulting in a polyvinyl alcohol colored in yellow. For example, in a case as described in Comparative Example 3 of using 1-propanethiol, not functioning as a polymerization terminator and reacting with a vinyl ester monomer and a cobalt complex, and in a case as described in Comparative Examples 2 and 4 of using TEMPO (2,2,6,6-tetramethylpiperidine 1-oxyl), being a stable radical, saponification of the produced polyvinyl ester is followed by generation of a large amount of carbon-carbon double bonds and coloring of the resulting polyvinyl alcohol is inevitable. In contrast, when the polymerization reaction of vinyl ester is terminated by adding a proton-donating polymerization terminator, the polyvinyl alcohol after saponification has a less carbon-carbon double bond content (X) to allow production of a polyvinyl alcohol with good hue. The carbon-carbon double bond content (X) is more preferably 0.03 mol % or less and even more preferably 0.01 mol % or less.

Moreover, the polyvinyl alcohol of the present invention preferably satisfies a formula (1) below. The left side (X·Mn) of the formula (1) is a product of the carbon-carbon double bond content (X) (mol %) of the polyvinyl alcohol based on the total monomer units and the number-average molecular weight (Mn). In this context, the number-average molecular weight (Mn) is a value inversely proportional to the number of polymer ends per unit weight, and thus a certain value or less of X·Mn means that the ratio of the carbon-carbon double bond content (X) to the number of polymer molecule ends is a certain value or less. When coloration is derived from the end structure, a higher number-average molecular weight (Mn) causes a smaller ratio of the ends and it is thus easier to obtain a polymer with high whiteness degree, and a lower number-average molecular weight (Mn) causes a greater ratio of the ends and it is thus difficult to obtain a polymer with high whiteness degree. The formula (1) shows that, when polyvinyl alcohols having similar molecular weights are compared, a polyvinyl alcohol with higher whiteness degree than before is obtained. X·Mn is more preferably 700 or less and even more preferably 400 or less.

$$X \cdot Mn \leq 1000 \tag{1}$$

The polyvinyl alcohol after the saponification step preferably has a cobalt element content from 0.01 to 50 ppm. A cobalt element content of more than 50 ppm causes a risk of worse hue and also a risk of worse thermal stability. The cobalt element content is more preferably 20 ppm or less and even more preferably 10 ppm or less. Meanwhile, having a cobalt element content of less than 0.01 ppm costs too much for removal work and is not industrially realistic.

The polyvinyl alcohol of the present invention preferably has a yellow index (YI) of 50 or less. The yellow index (YI) is measured in accordance with ASTM D1925. A polyvinyl alcohol having a smaller carbon-carbon double bond content (X) as described above achieves a polyvinyl alcohol having a low YI with excellent hue. The YI is more preferably 40 or less, even more preferably 30 or less, and particularly preferably 20 or less. In this context, the YI is obtained by measuring a sample of powder of a polyvinyl alcohol resin spread over a laboratory dish not to press the powder using a spectrophotometric colorimeter (D65 light source, CM-A120 white calibration plate, specular reflection measurement SCE). Specifically, the YI is a value measured in accordance with the method described in Examples.

The polyvinyl alcohol of the present invention preferably has a 1,2-glycol bond content from 0.7 to 1.5 mol %. A 1,2-glycol bond content of 1.5 mol % or less allows a polyvinyl alcohol to have high crystallinity. In addition to a low molecular weight distribution (Mw/Mn), it is possible to have higher crystallinity. The 1,2-glycol bond content is more preferably 1.4 mol % or less and even more preferably 1.3 mol % or less. Meanwhile, a 1,2-glycol bond content of less than 0.7 mol % causes a decrease in handling properties, such as reduced water solubility. The 1,2-glycol bond content is more preferably 0.9 mol % or more and even more preferably 1.1 mol % or more.

Examples of the method for molding the polyvinyl alcohol of the present invention may include a method comprising forming from the form of a solution, such as water and dimethyl sulfoxide, and a method comprising forming by heating for plasticization of a polyvinyl alcohol, for example, extrusion molding, injection molding, inflation molding, press molding, blow molding, and the like. By these methods, shaped articles are obtained in an arbitrary shape, such as fiber, a film, a sheet, a tube, and a bottle.

In the polyvinyl alcohol of the present invention, various additives may be blended as long as the effects of the present invention are not impaired. Examples of the additives may include fillers, process stabilizers such as a copper compound, weathering agents, colorants, ultraviolet absorbers, light stabilizers, antioxidants, antistatic agents, flame retardants, plasticizers, other resins such as starch, lubricants, perfumes, defoamers, deodorants, extenders, removers, mold releases, reinforcements, crosslinkers, mildewcides, antiseptics, crystallization retardants, and the like.

The polyvinyl alcohol of the present invention is applicable to various types of use utilizing its properties. Examples of such use may include surfactants, paper coating agents, paper internal agents, pigment binders, adhesives, nonwoven fabric binders, paints, fiber treating agents, fiber sizings, dispersion stabilizers, films, sheets, bottles, fibers, thickeners, flocculants, soil improvers, and the like.

EXAMPLES

The present invention is described below more in detail by way of Examples. Note that the present invention is not limited at all by Examples below. Polyvinyl alcohols were measured and evaluated in the following methods.

[Induction Period and Growth Period]

The "induction period" herein means a period between start of warming the reaction liquid and start of consuming the vinyl acetate, and the "growth period" means a period between start of consuming the vinyl acetate and reach to a target degree of conversion. These periods are calculated by, for example, sampling for arbitrary time after start of consuming the vinyl acetate, calculating a consumption rate of the vinyl acetate from the solid content concentration, and plotting time-vinyl acetate consumption rate correlation to define a boundary between the "induction period" and the "growth period" as the time to have a vinyl acetate consumption rate of 0% in a case of drawing approximate lines in at least 3 points.

[Measurement of Number-Average Molecular Weight (Mn) and Molecular Weight Distribution (Mw/Mn)]

Using a size exclusion high speed liquid chromatograph "HLC-8320GPC" manufactured by Tosoh Corp., a number-average molecular weight (Mn) and a molecular weight distribution (Mw/Mn) were measured. Measurement conditions were as follows.

Column: two HFIP columns "GMHHR-H(S)" manufactured by Tosoh Corp., serial connection Reference material: polymethylmethacrylate Solvent and mobile phase: sodium trifluoroacetate-HFIP solution (concentration of 20 mM)

Flow rate: 0.2 mL/min.

Temperature: 40° C.

Sample solution concentration: 0.1 wt % (filtered through a filter with an opening diameter of 0.45 μm)

Injected amount: 10 μL

Detector: RI

[Measurement of Carbon-Carbon Double Bond Content (X) (mol %)]

Using a nuclear magnetic resonance apparatus "LAMBDA 500" manufactured by JEOL Ltd., the polyvinyl alcohol was $^1$H-NMR measured at 40° C. and 95° C. As the solvent, DMSO-$d_6$ was used. The carbon-carbon double bond content (X) (mol %) of the polyvinyl alcohol based on the total monomer units was calculated as follows. Assuming that a total integral (3.3 ppm, 3.4 ppm, 3.5 ppm, 3.6 ppm, 3.9 ppm, and 4.8 ppm; among them, for the four peaks from 3.3 to 3.6 ppm, each integral was calculated from comparison of measurements at 40° C./95° C.) of peaks derived from a methine proton (—CH$_2$C$\underline{\text{H}}$(OH)— or —CH$_2$C$\underline{\text{H}}$(OCOCH$_3$)—) of a known polyvinyl alcohol is 100, an integral of all peaks detected in a range from 5.5 to 7.5 ppm was calculated to define ½ of the value as X (mol %). In calculation of the integral between 5.5 and 7.5 ppm, when a baseline was tilted, an area of each peak was calculated considering the tilt.

[Measurement of Amount of 1,2-Glycol Bonds (mol %)]

A polyvinyl alcohol dried under reduced pressure at 90° C. for 2 days was dissolved in DMSO-$d_6$ and several drops of trifluoroacetic acid were added to prepare a sample for measurement. Using a nuclear magnetic resonance apparatus "LAMBDA 500" manufactured by JEOL Ltd., $^1$H-NMR measurement was performed at 80° C. In this situation, for a sample having a degree of saponification of less than 99.9 mol %, the sample was saponified to 99.9 mol % or more and then served for the measurement. Peaks derived from methine in the vinyl alcohol units were attributed to 3.2 to 4.0 ppm (integral A) and a peak derived from one methine in the 1,2-glycol bond was attributed to 3.25 ppm (integral B). It was then possible to calculate the 1,2-glycol bond content by a formula below.

Amount of 1,2-Glycol Bonds (mol %)=(B/A)×100

[Measurement of Cobalt Element Content]

To a polyvinyl alcohol equivalent to 0.5 g of solid content, concentrated nitric acid was added, and heated and dissolved and then diluted with ion-exchange water to obtain 20 mL of a nitric acid solution of the polyvinyl alcohol. From the cobalt concentration of the solution measured with an ICP emission spectrometer (IRIS-AP, manufactured by Nippon Jarrell-Ash Co. Ltd.), the cobalt content (ppm) in the polyvinyl alcohol was obtained.

[Evaluation of Hue (YI)]

The YI (ASTM D1925) of powder of the produced polyvinyl alcohol was measured using a spectrophotometric colorimeter "CM-3500d" manufactured by Konica Minolta, Inc. (light source: D65, CM-A120 white calibration plate, CM-A126 laboratory dish set used, specular reflection measurement SCE, measured diameter of ɸ30 mm). To the laboratory dish, 5 g of the sample was added, a side was tapped not to for shaking press the powder, and the powder was evenly and uniformly spread. In this condition, measurement was performed 10 times in total (each time, the laboratory dish was shaken once before remeasurement) and an average of them was obtained as the YI of the resin.

[Evaluation of Rate of Dissolution in Water]

The polyvinyl alcohol was added to ion-exchange water to have the concentration of 4 mass % and was heated and stirred at 100° C. to be dissolved. The dissolution performance was determined by the following criteria.

A: completely dissolved within 1 hour after a temperature raise.

B: completely dissolved between 1 and 3 hours after a temperature raise.

C: completely dissolved between 3 and 6 hours after a temperature raise.

D: completely dissolved between 6 and 12 hours after a temperature raise.

E: taken time of more than 12 hours after a temperature raise until complete dissolution or not completely dissolved with, for example, developing cloudy points.

[Evaluation of Percentage of Saturated Water Content]

An aqueous polyvinyl alcohol solution with a concentration of 10 mass % was prepared and casted in a mold made of PET to be left standing in a room controlled at 20° C., 21% RH for 1 week for drying. A film thus obtained was removed from the mold and a central film thickness was measured with a thickness gauge to determine films with a film thickness from 10 to 200 µm as evaluation objects. Such a film thus obtained was conditioned at 20° C., 80% RH for 1 week and then a part of the film was cut out to measure the percentage [mass %] of saturated water content of the film with a halogen moisture analyzer (setting temperature of 150° C.).

[Evaluation of Mechanical Properties]

The film used for evaluation of the percentage of saturated water content and left standing in a room controlled at 20° C., 80% RH for 1 week for drying was cut out in 10 mm×800 mm and subjected to strength-elongation measurement using an autograph "AG-IS" manufactured by Shimadzu Corp. in the conditions of a distance between chucks of 50 mm and a tensile speed of 500 mm/min. to obtain a modulus of elasticity [kgf/mm$^2$] and a maximum stress [kgf/mm$^2$] in the conditions of 20° C., 80% RH. The measurement was performed 5 times for each sample to calculate an average of them.

[Evaluation of Oxygen Transmission Rate]

In a technique similar to that of evaluation of mechanical properties previously mentioned, a film was prepared. The film thus obtained was conditioned at 20° C., 80% RH for 1 week and the oxygen transmission rate (cc/[m$^2$·day·atm]) was measured in accordance with a method described in JIS K7126 (equal pressure method) in the conditions of 20° C., 80% RH using MOCON OX-TRAN2/20 type manufactured by Modern Controls Inc. to calculate the oxygen transmission rate (cc·20 µm/[m$^2$·day·atm]) converted to be equivalent to a film thickness of 20 µm.

Example 1

To a reactor provided with a stirrer, a reflux condenser tube, and an initiator addition port, 0.24 parts by mass of cobalt (II) acetylacetonate and 0.86 parts by mass of V-70 [2,2'-azobis(4-methoxy-2,4-dimethylvaleronitrile)] as an initiator were added. Inert gas purge was performed three times in which inside the reactor was vacuumed and then nitrogen was introduced. After that, 640 parts by mass of vinyl acetate purified by simple distillation was added, followed by immersion of the reactor in a water bath and heating to have an internal temperature at 30° C. and stirring. Sampling was appropriately performed and progress of the polymerization was confirmed from the solid content concentration. When the conversion of vinyl acetate reached 15%, the water bath was substituted to iced water bath for rapidly cooling the reactor to have the internal temperature of 10° C. or less. Here, 20.8 parts by mass of a methanol solution (concentration of 10 mass %, 2.08 parts by mass as sorbic acid) of sorbic acid (the chain transfer constant at 60° C. to vinyl acetate monomers was more than 0.1) was added as a polymerization terminator. In the polymerization reaction, the induction period was 11 hours and the growth period was 2.1 hours.

After adding the polymerization terminator, the reactor was connected to a vacuum line to distill off the residual vinyl acetate at 15° C. under reduced pressure. During visual confirmation of inside the reactor, distillation was continued while methanol was appropriately added upon a viscosity rise. The internal temperature was further raised to 50° C. and heated and stirred for 1 hour. After that, the reactor was cooled to 30° C. and methanol was distilled off at 35° C. under reduced pressure while adding ethyl acetate to obtain an ethyl acetate solution of polyvinyl acetate. Here, 600 parts by mass of an aqueous acetic acid solution (pH of 2.0) at a concentration of 25 mass % was added and stirred for 5 minutes and then left it standing for 30 minutes to separate into two layers. After a water layer was drawn out by a syringe, the reactor was connected again to the vacuum line to distill off the residual ethyl acetate at 30° C. under reduced pressure. When ethyl acetate was distilled off, methanol was added to dissolve polyvinyl acetate and the solution was dropped in deionized water for precipitation of polyvinyl acetate. Polyvinyl acetate was recovered by filtration operation and dried in a vacuum drier at 40° C. for 24 hours to obtain polyvinyl acetate. Details of the polymerization step described above are shown in Table 1.

Then, to a reactor same as above, 100 parts by mass of polyvinyl acetate thus obtained and 400 parts by mass of methanol were added and dissolved (concentration of 20 mass %) and then the water bath was heated until an internal temperature reached 40° C. while heating and stirring. Here, 66.4 parts by mass of a methanol solution (concentration of 14 mass %) of sodium hydroxide was added and saponified at 40° C. (9.3 parts by mass as sodium hydroxide). A gel product thus generated was ground by a grinder and further left at 40° C. for progress of saponification for 1 hour. To a saponified product thus obtained, 66.4 parts by mass of a methanol solution (concentration of 14 mass %) of sodium hydroxide was further added to drive the saponification reaction for additional 1 hour in heat reflux at 65° C. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield an intended polyvinyl alcohol. Details of the saponification step described above are shown in Table 2.

Various properties of the polyvinyl alcohol thus produced were measured to evaluate the performance. The degree of saponification was 99.9 mol %, the number-average molecular weight (Mn) was 57,620, and the molecular weight distribution (Mw/Mn) was 1.49. The carbon-carbon double bond content (X) was the limit of measurement of less than 0.001 mol %, which means not to be detected. The 1,2-glycol bond content was 1.16 mol %. The cobalt content was 4.1 ppm. The hue (YI) was 12.6. The rate of dissolution in water was evaluated as A. The percentage of saturated water content was 13.8 mass %. The modulus of elasticity was 12.9 kgf/mm$^2$. The maximum stress was 4.1 kgf/mm$^2$. The oxygen transmission rate was 39.5 cc·20 µm/(m$^2$·day·atm). The above results are collectively shown in Table 3.

Example 2

Polymerization reaction of vinyl acetate was performed in the same conditions as Example 1 other than adding 0.12 parts by mass of cobalt (II) acetylacetonate and 0.43 parts by mass of V-70 as an initiator. When the conversion of vinyl acetate reached 20%, the water bath was substituted to iced water bath for rapidly cooling the reactor to have the internal temperature of 10° C. or less. Here, 10.4 parts by mass of a methanol solution (concentration of 10 mass %, 1.04 parts by mass as sorbic acid) of sorbic acid was added as a polymerization terminator and same operations were conducted later as those in the method described in Example 1 to obtain a polyvinyl acetate. In the polymerization reaction, the induction period was 5.5 hours and the growth period was 2.5 hours. Details of the polymerization step described above are shown in Table 1.

Then, to a reactor same as above, 45 parts by mass of polyvinyl acetate thus obtained and 180 parts by mass of methanol were added and dissolved (concentration of 20 mass %). Two-step saponification reaction was conducted in the same method as that described in Example 1 other than changing the amount of the methanol solution (concentration of 14 mass %) of sodium hydroxide to be added to this solution in each step to 15.0 parts by mass (2.1 parts by mass as sodium hydroxide) to yield an intended polyvinyl alcohol. Details of the saponification step are shown in Table 2. The results of measurement and evaluation of the polyvinyl alcohol thus produced are collectively shown in Table 3.

Example 3

Polymerization reaction of vinyl acetate was performed in the same conditions as Example 1 other than adding 0.17 parts by mass of cobalt (II) acetylacetonate and 0.63 parts by mass of V-70 as an initiator. When the conversion of vinyl acetate reached 21%, the water bath was substituted to iced water bath for rapidly cooling the reactor to have the internal temperature of 10° C. or less. Here, 15.2 parts by mass of a methanol solution (concentration of 10 mass %, 1.52 parts by mass as sorbic acid) of sorbic acid was added as a polymerization terminator and same operations were conducted later as those in the method described in Example 1 to obtain a polyvinyl acetate. In the polymerization reaction, the induction period was 15 hours and the growth period was 3 hours. Details of the polymerization step described above are shown in Table 1.

Then, to a reactor same as above, 50 parts by mass of polyvinyl acetate thus obtained and 200 parts by mass of methanol were added and dissolved (concentration of 20 mass %) and then the water bath was heated until an internal temperature reached 40° C. while heating and stirring. Here, 5.0 parts by mass of a methanol solution (concentration of 14 mass %) of sodium hydroxide was added and saponified at 40° C. (0.70 parts by mass as sodium hydroxide). A gel product thus generated was ground by a grinder and further left at 40° C. for progress of saponification for 1 hour, and then 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield an intended polyvinyl alcohol. Details of the saponification step are shown in Table 2. The results of measurement and evaluation of the polyvinyl alcohol thus produced are collectively shown in Table 3.

Example 4

Polymerization reaction of vinyl acetate was performed in the same conditions as Example 1 other than adding 1.91 parts by mass of cobalt (II) acetylacetonate and 6.88 parts by mass of V-70 as an initiator. When the conversion of vinyl acetate reached 32%, the water bath was substituted to iced water bath for rapidly cooling the reactor to have the internal temperature of 10° C. or less. Here, 166.7 parts by mass of a methanol solution (concentration of 10 mass %, 16.7 parts by mass as sorbic acid) of sorbic acid was added as a polymerization terminator and same operations were conducted later as those in the method described in Example 1 to obtain a polyvinyl acetate. In the polymerization reaction, the induction period was 16 hours and the growth period was 5.5 hours. Details of the polymerization step described above are shown in Table 1.

Then, to a reactor same as above, 90 parts by mass of polyvinyl acetate thus obtained and 135 parts by mass of methanol were added and dissolved (concentration of 40 mass %). Two-step saponification reaction was conducted in the same method as that described in Example 1 other than changing the amount of the methanol solution (concentration of 14 mass %) of sodium hydroxide to be added to this solution in each step to 29.9 parts by mass (4.2 parts by mass as sodium hydroxide) to yield an intended polyvinyl alcohol. Details of the saponification step are shown in Table 2. The results of measurement and evaluation of the polyvinyl alcohol thus produced are collectively shown in Table 3.

Example 5

To a reactor same as that in Example 1, 0.08 parts by mass of cobalt (II) acetylacetonate and 0.29 parts by mass of V-70 as an initiator were added. Inert gas purge was performed three times in which inside the reactor was vacuumed and then nitrogen was introduced. After that, 640 parts by mass of vinyl acetate subjected to simple distillation purification and 427 parts by mass of methyl acetate similarly subjected to simple distillation purification were added, followed by immersion of the reactor in a water bath and heating to have an internal temperature at 30° C. and stirring. Sampling was appropriately performed and progress of the polymerization was confirmed from the solid content concentration. When the conversion of vinyl acetate reached 19%, the water bath was substituted to iced water bath for rapidly cooling the reactor to have the internal temperature of 10° C. or less. Here, 6.9 parts by mass of a methanol solution (concentration of 10 mass %, 0.69 parts by mass as sorbic acid) of sorbic acid was added as a polymerization terminator and same operations were conducted later as those in the method described in Example 1 to obtain a polyvinyl acetate. In the polymerization reaction, the induction period was 5 hours and the growth period was 3.8 hours. Details of the polymerization step described above are shown in Table 1.

Then, to a reactor same as above, 85 parts by mass of polyvinyl acetate thus obtained and 1615 parts by mass of methanol were added and dissolved (concentration of 5 mass %). Saponification reaction was conducted in the same method as that described in Example 3 other than changing the amount of the methanol solution (concentration of 14 mass %) of sodium hydroxide to be added to this solution to 3.9 parts by mass (0.55 parts by mass as sodium hydroxide) to yield an intended polyvinyl alcohol. Details of the saponification step are shown in Table 2, The results of measurement and evaluation of the polyvinyl alcohol thus produced are collectively shown in Table 3.

Example 6

To a reactor same as that in Example 1, 0.24 parts by mass of cobalt (II) acetylacetonate and 0.86 parts by mass of V-70 as an initiator were added. Inert gas purge was performed three times in which inside the reactor was vacuumed and then nitrogen was introduced. After that, 640 parts by mass of vinyl acetate subjected to simple distillation purification and 640 parts by mass of methyl acetate similarly subjected to simple distillation purification were added, followed by immersion of the reactor in a water bath and heating to have an internal temperature at 35° C. and stirring. Sampling was appropriately performed and progress of the polymerization was confirmed from the solid content concentration. When the conversion of vinyl acetate reached 34%, the water bath was substituted to iced water bath for rapidly cooling the reactor to have the internal temperature of 10° C. or less. Here, 20.8 parts by mass of a methanol solution (concentration of 10 mass %, 2.08 parts by mass as sorbic acid) of sorbic acid was added as a polymerization terminator and same operations were conducted later as those in the method described in Example 1 to obtain a polyvinyl acetate. In the polymerization reaction, the induction period was 3 hours and the growth period was 5.5 hours. Details of the polymerization step described above are shown in Table 1.

Then, to a reactor same as above, 90 parts by mass of polyvinyl acetate thus obtained and 810 parts by mass of methanol were added and dissolved (concentration of 10 mass %). Saponification reaction was conducted in the same method as that described in Example 3 other than changing the amount of the methanol solution (concentration of 14 mass %) of sodium hydroxide to be added to this solution to 4.5 parts by mass (0.63 parts by mass as sodium hydroxide) to yield an intended polyvinyl alcohol. Details of the saponification step are shown in Table 2. The results of measurement and evaluation of the polyvinyl alcohol thus produced are collectively shown in Table 3.

Comparative Example 1

In a reactor provided with a stirrer, a reflux condenser tube, an argon inlet tube, and an initiator addition port, 640 parts by mass of vinyl acetate and 270 parts by mass of methanol were charged. Inside the reactor was subjected to inert gas purge for 30 minutes while nitrogen bubbling. A water bath was heated to start a temperature rise of the reactor, and when an internal temperature reached 60° C., 0.17 parts by mass of azobisisobutyronitrile (AIBN) was added as an initiator to start polymerization. Sampling was appropriately performed and progress of the polymerization was confirmed from the solid content concentration. When the conversion of vinyl acetate reached 30%, the water bath was substituted to iced water for cooling the internal temperature to 30° C. to terminate the polymerization. The reactor was connected to a vacuum line to distill off the residual vinyl acetate together with methanol at 30° C. under reduced pressure. During visual confirmation of inside the reactor, distillation was continued while methanol was appropriately added upon a viscosity rise to obtain a methanol solution of polyvinyl acetate. In the polymerization reaction, the induction period was 0.2 hour and the growth period was 2.7 hours. Details of the polymerization step described above are shown in Table 1.

To the methanol solution (150 parts by mass as polyvinyl acetate) of polyvinyl acetate, methanol was further added to have the concentration of polyvinyl acetate of 20 mass %. To a reactor same as above, this solution was added and the water bath was heated until an internal temperature reached 40° C. while heating and stirring. Saponification reaction was conducted in the same method as that described in Example 3 other than changing the amount of the methanol solution (concentration of 14 mass %) of sodium hydroxide to be added to this solution to 10.0 parts by mass (1.4 parts by mass as sodium hydroxide) to yield an intended polyvinyl alcohol. Details of the saponification step are shown in Table 2. The results of measurement and evaluation of the polyvinyl alcohol thus produced are collectively shown in Table 3.

Comparative Example 2

Polymerization reaction of vinyl acetate was performed in the same conditions as Example 1 other than adding 3.83 parts by mass of cobalt (II) acetylacetonate and 13.75 parts by mass of V-70 as an initiator. When the conversion of vinyl acetate reached 30%, 46.4 parts by mass of TEMPO was added as a polymerization terminator. An internal temperature was raised at 40° C. and heated and stirred for 1 hour. Here, 600 parts by mass of an aqueous acetic acid solution at a concentration of 25 mass % was added and stirred for 5 minutes and then left it standing for 30 minutes to separate into two layers. After a water layer was drawn out by a syringe, the reactor was connected to a vacuum line to distill off the residual vinyl acetate at 30° C. under reduced pressure. When vinyl acetate was distilled off, methanol was added to dissolve polyvinyl acetate and the solution was dropped in deionized water for precipitation of polyvinyl acetate. Polyvinyl acetate was recovered by filtration operation and dried in a vacuum drier at 40° C. for 24 hours to obtain polyvinyl acetate. In the polymerization reaction, the induction period was 20 hours and the growth period was 5.5 hours. Details of the polymerization step described above are shown in Table 1.

Then, to a reactor same as above, 150 parts by mass of polyvinyl acetate thus obtained and 225 parts by mass of methanol were added and dissolved (concentration of 40 mass %) and then the water bath was heated until an internal temperature reached 40° C. while heating and stirring. Here, 49.8 parts by mass of a methanol solution (concentration of 14 mass %) of sodium hydroxide was added, and even though marked coloring (dark brown) was found at the moment of addition, saponification (7.0 parts by mass as sodium hydroxide) was performed at 40° C. with no additional operation. A gel product thus generated was ground by a grinder and further left at 40° C. for progress of saponification for 1 hour. To a saponified product thus obtained, 49.8 parts by mass of a methanol solution (concentration of 14 mass %) of sodium hydroxide was further added to drive the saponification reaction for additional 1 hour in heat reflux at 65° C. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield an intended polyvinyl alcohol. Details of the saponification step are shown in Table 2. The results of measurement and evaluation of the polyvinyl alcohol thus produced are collectively shown in Table 3.

Comparative Example 3

Polymerization reaction of vinyl acetate was performed in the same conditions as Example 1 other than adding 1.91 parts by mass of cobalt (II) acetylacetonate and 6.88 parts by mass of V-70 as an initiator. When the conversion of vinyl acetate reached 30%, 11.3 parts by mass of 1-propanethiol was added as a polymerization terminator. An internal temperature was raised at 50° C. and heated and stirred for 2 hours, and marked coloring (black) was found. The reactor was opened to atmosphere and the reaction liquid thus obtained was passed through an alumina column, followed by extraction with methyl acetate. The vinyl acetate and methyl acetate remained in an extract thus obtained were distilled off at 40° C. under reduced pressure. When vinyl acetate and methyl acetate were distilled off, methanol was added to dissolve polyvinyl acetate and the solution was dropped in deionized water for precipitation of polyvinyl acetate, followed by filtration to obtain a solid. The solid was dried in a vacuum drier at 40° C. for 24 hours to obtain polyvinyl acetate. In the polymerization reaction, the induction period was 18 hours and the growth period was 5.5 hours. Details of the polymerization step described above are shown in Table 1.

Then, to a reactor same as above, 150 parts by mass of polyvinyl acetate thus obtained and 225 parts by mass of methanol were added and dissolved (concentration of 40 mass %) and then the water bath was heated until an internal temperature reached 40° C. while heating and stirring. Here, 49.8 parts by mass of a methanol solution (concentration of 14 mass %) of sodium hydroxide was added, and even though marked coloring (dark brown to black) was found at the moment of addition, saponification (7.0 parts by mass as sodium hydroxide) was performed at 40° C. with no additional operation. A gel product thus generated was ground by a grinder and further left at 40° C. for progress of saponification for 1 hour. To a saponified product thus obtained, 49.8 parts by mass of a methanol solution (concentration of 14 mass %) of sodium hydroxide was further added to drive the saponification reaction for additional 1 hour in heat reflux at 65° C. After that, 200 parts by mass of methyl acetate was added to neutralize the remaining alkali. Termination of the neutralization was confirmed using a phenolphthalein indicator, followed by filtration to obtain a solid. To the solid, 500 parts by mass of methanol was added for heat reflux for 1 hour. After that, a solid obtained by centrifugal dewatering was dried in a vacuum drier at 40° C. for 24 hours to yield an intended polyvinyl alcohol. Details of the saponification step are shown in Table 2. The results of measurement and evaluation of the polyvinyl alcohol thus produced are collectively shown in Table 3.

Comparative Example 4

Polymerization reaction of vinyl acetate was performed in the same conditions as Example 1 other than adding 3.83 parts by mass of cobalt (II) acetylacetonate and 13.80 parts by mass of V-70 as an initiator. When the conversion of vinyl acetate reached 18%, 46.4 parts by mass of TEMPO was added. An internal temperature was raised at 40° C. and heated and stirred for 1 hour and same operations were conducted later as those in the method described in Comparative Example 2 to obtain polyvinyl acetate. In the polymerization reaction, the induction period was 20 hours and the growth period was 3.6 hours. Details of the polymerization step described above are shown in Table 1.

Then, to a reactor same as above, 80 parts by mass of polyvinyl acetate thus obtained and 98 parts by mass of methanol were added and dissolved (concentration of 45 mass %). Saponification reaction was conducted in the same method as that described in Example 3 other than changing the amount of the methanol solution (concentration of 14 mass %) of sodium hydroxide to be added to this solution to 26.6 parts by mass (3.7 parts by mass as sodium hydroxide) and changing the reaction temperature to 50° C. to yield an intended polyvinyl alcohol. Details of the saponification step are shown in Table 2. The results of measurement and evaluation of the polyvinyl alcohol thus produced are collectively shown in Table 3.

Comparative Example 5

Polymerization reaction of vinyl acetate was performed with the same raw material composition and in the same conditions as those in Example 1 to obtain polyvinyl acetate. Details of the polymerization step and the termination step are shown in Table 1. Then, to a reactor same as above, 100 parts by mass of polyvinyl acetate thus obtained and 400 parts by mass of methanol were added and dissolved (concentration of 20 mass %) and then the water bath was heated until an internal temperature reached 40° C. while heating and stirring. Saponification reaction was conducted in the same method as that described in Example 3 other than changing the amount of the methanol solution (concentration of 14 mass %) of sodium hydroxide to be added to this solution to 2.7 parts by mass (0.38 parts by mass as sodium hydroxide). Details of the saponification step are shown in Table 2. The results of measurement and evaluation of the polyvinyl alcohol thus produced are collectively shown in Table 3.

TABLE 1

| | VAc Added Amount [parts by mass] | Solvent Type | Solvent Added Amount [parts by mass] | Initiator Type | Initiator Added Amount [parts by mass] | Control Agent Type | Control Agent Added Amount [parts by mass] | Polymerization Temperature [° C.] | Terminator Type | Terminator Added Amount [parts by mass] | Termination Temperature [° C.] |
|---|---|---|---|---|---|---|---|---|---|---|---|
| Example 1 | 640 | — | — | V-70 | 0.86 | Co(acac)$_2$ | 0.24 | 30 | Sorbic Acid | 2.08 | 50 |
| Example 2 | 640 | — | — | V-70 | 0.43 | Co(acac)$_2$ | 0.12 | 30 | Sorbic Acid | 1.04 | 50 |
| Example 3 | 640 | — | — | V-70 | 0.63 | Co(acac)$_2$ | 0.17 | 30 | Sorbic Acid | 1.52 | 50 |
| Example 4 | 640 | — | — | V-70 | 6.88 | Co(acac)$_2$ | 1.91 | 30 | Sorbic Acid | 16.7 | 50 |
| Example 5 | 640 | Methyl Acetate | 427 | V-70 | 0.29 | Co(acac)$_2$ | 0.08 | 30 | Sorbic Acid | 0.69 | 50 |
| Example 6 | 640 | Methyl Acetate | 640 | V-70 | 0.86 | Co(acac)$_2$ | 0.24 | 35 | Sorbic Acid | 2.08 | 50 |
| Comparative Example 1 | 640 | Methanol | 270 | AIBN | 0.17 | — | — | 60 | — | — | 30 |
| Comparative Example 2 | 640 | — | — | V-70 | 13.75 | Co(acac)$_2$ | 3.83 | 30 | TEMPO | 46.4 | 40 |
| Comparative Example 3 | 640 | — | — | V-70 | 6.88 | Co(acac)$_2$ | 1.91 | 30 | Propanethiol | 11.3 | 50 |

TABLE 1-continued

| | VAc Added Amount [parts by mass] | Solvent Type | Solvent Added Amount [parts by mass] | Initiator Type | Initiator Added Amount [parts by mass] | Control Agent Type | Control Agent Added Amount [parts by mass] | Polymerization Temperature [° C.] | Terminator Type | Terminator Added Amount [parts by mass] | Termination Temperature [° C.] |
|---|---|---|---|---|---|---|---|---|---|---|---|
| Comparative Example 4 | 640 | — | — | V-70 | 13.80 | Co(acac)$_2$ | 3.83 | 30 | TEMPO | 46.4 | 40 |
| Comparative Example 5 | 640 | — | — | V-70 | 0.86 | Co(acac)$_2$ | 0.24 | 30 | Sorbic Acid | 2.08 | 50 |

TABLE 2

| | Saponification Step | | | | | |
|---|---|---|---|---|---|---|
| | PVAc Added Amount [parts by mass] | PVAc concentration [mass %] | Total Added Amount of Alkali [parts by mass] | Reaction Temperature [° C.] | Reaction Time [h] | Degree of Saponification [mol %] |
| Example 1 | 100 | 20 | 18.6 | 40-65 | 2 | 99.9 |
| Example 2 | 45 | 20 | 4.2 | 40-65 | 2 | 99.6 |
| Example 3 | 50 | 20 | 0.70 | 40 | 1 | 98.4 |
| Example 4 | 90 | 40 | 8.4 | 40-65 | 2 | 99.9 |
| Example 5 | 85 | 5 | 0.55 | 40 | 1 | 88.0 |
| Example 6 | 90 | 10 | 0.63 | 40 | 1 | 90.2 |
| Comparative Example 1 | 150 | 20 | 1.4 | 40 | 1 | 95.0 |
| Comparative Example 2 | 150 | 40 | 14.0 | 40-65 | 2 | 99.9 |
| Comparative Example 3 | 150 | 40 | 14.0 | 40-65 | 2 | 99.9 |
| Comparative Example 4 | 80 | 45 | 3.7 | 50 | 1 | 99.9 |
| Comparative Example 5 | 100 | 20 | 0.38 | 40 | 1 | 75.0 |

TABLE 3

| | Mn | Mw/Mn | Carbon-Cartoon Double Bond Content (X) [mol %] | X•Mn | 1,2-Glycol Bond Content [mol %] | Cobalt Content [ppm] | Hue YI | Rate of Dissolution in Water | Percentage of Saturated Water Content [mass %] | Modulus of Elasticity [kgf/mm$^2$] | Maximum Stress [kgf/mm$^2$] | Oxygen Transmission Rate [cc · 20 μm/(m$^2$ · day · atm)] |
|---|---|---|---|---|---|---|---|---|---|---|---|---|
| Example 1 | 57,620 | 1.49 | <0.001 | — | 1.16 | 4.1 | 12.6 | A | 13.8 | 12.9 | 4.1 | 39.5 |
| Example 2 | 154,760 | 1.52 | 0.003 | 464 | 1.17 | 2.2 | 30.8 | B | 13.2 | 17.5 | 4.5 | 39.9 |
| Example 3 | 110,880 | 1.51 | <0.001 | — | 1.16 | 1.9 | 10.5 | A | 14.1 | 12.1 | 3.2 | 46.0 |
| Example 4 | 13,780 | 1.38 | 0.04 | 551 | 1.15 | 10.1 | 45.6 | A | 13.8 | 10.5 | 2.1 | 38.0 |
| Example 5 | 236,030 | 1.56 | <0.001 | — | 1.17 | 0.9 | 9.8 | B | 17.8 | 2.9 | 4.2 | 121.1 |
| Example 6 | 128,950 | 1.65 | <0.001 | — | 1.31 | 3.7 | 8.6 | A | 15.6 | 6.1 | 4.1 | 96.5 |
| Comparative Example 1 | 36,230 | 2.45 | <0.001 | — | 1.62 | — | 4.6 | A | 17.8 | 5.6 | 3.3 | 135.6 |
| Comparative Example 2 | 6,640 | 1.57 | 0.27 | 1793 | 1.15 | 19.1 | 108.5 | A | 13.9 | 7.4 | 1.5 | 90.4 |
| Comparative Example 3 | 13,260 | 1.65 | 0.15 | 1989 | 1.16 | 10.6 | 166.1 | D | 12.1 | 9.8 | 1.7 | 92.3 |
| Comparative Example 4 | 3,720 | 1.39 | 0.54 | 2009 | 1.15 | 20.5 | 179.2 | C | — | — | — | — |
| Comparative Example 5 | 56,940 | 1.42 | <0.001 | — | 1.17 | 3.9 | 16.7 | A | 19.6 | 0.9 | 1.9 | 412.8 |

The invention claimed is:

1. A polyvinyl alcohol consisting of vinyl alcohol units and vinyl ester units; wherein
- a number-average molecular weight (Mn) of the polyvinyl alcohol is from 4,400 to 220,000,
- a molecular weight distribution (Mw/Mn) of the polyvinyl alcohol is from 1.05 to 1.70,
- a content of vinyl alcohol units of the polyvinyl alcohol is from 80 to 99.99 mol %, and
- a carbon-carbon double bond content (X) of the polyvinyl alcohol is 0.1 mol % or less based on total monomer units, and satisfying a formula;

$$X \cdot Mn \leq 1000 \qquad (1).$$

2. The polyvinyl alcohol of claim 1, wherein a yellow index (YI) measured in accordance with ASTM D1925 is 50 or less.

3. A polyvinyl alcohol consisting of vinyl alcohol units and vinyl ester units; wherein
- a number-average molecular weight (Mn) of the polyvinyl alcohol is from 11.000 to 190,000, a molecular weight distribution (Mw/Mn) from 1.05 to 1.60, a degree of saponification from 80 to 99.99 mol %, and a yellow index (YI) measured in accordance with ASTM D1925 of 50 or less.

4. The polyvinyl alcohol of claim 1, wherein a 1,2-glycol bond content is from 0.7 to 1.5 mol %.

5. The polyvinyl alcohol of claim 2, wherein a 1,2-glycol bond content is from 0.7 to 1.5 mol %.

6. The polyvinyl alcohol of claim 3, wherein a 1,2-glycol bond content is from 0.7 to 1.5 mol %.

* * * * *